(12) United States Patent
Wikström et al.

(10) Patent No.: US 7,515,401 B2
(45) Date of Patent: Apr. 7, 2009

(54) COMPACT DISPLAY MODULE

(76) Inventors: Mikael Wikström, Basgränden 10, SE-224 68 Lund (SE); Martin Grip, Slussgatan 1B, SE-211 30 Malmö (SE)

( * ) Notice: Subject to any disclaimer, the term of this patent is extended or adjusted under 35 U.S.C. 154(b) by 529 days.

(21) Appl. No.: 10/547,103

(22) PCT Filed: Feb. 13, 2004

(86) PCT No.: PCT/EP2004/001344

§ 371 (c)(1),
(2), (4) Date: Aug. 26, 2005

(87) PCT Pub. No.: WO2004/077800

PCT Pub. Date: Sep. 10, 2004

(65) Prior Publication Data

US 2006/0146486 A1 Jul. 6, 2006

Related U.S. Application Data

(60) Provisional application No. 60/473,508, filed on May 27, 2003.

(30) Foreign Application Priority Data

| Feb. 27, 2003 | (EP) | .................................. 03075590 |
| May 19, 2003 | (EP) | .................................. 03011326 |

(51) Int. Cl.
*G06F 1/16* (2006.01)
(52) U.S. Cl. .......................... 361/681; 361/618; 349/58; 349/152
(58) Field of Classification Search ................. 361/681, 361/683, 816; 349/58, 152

See application file for complete search history.

(56) References Cited

U.S. PATENT DOCUMENTS

| 5,479,285 | A | | 12/1995 | Burke ........................... 359/83 |
| 5,808,707 | A | * | 9/1998 | Niibori et al. .................. 349/60 |
| 5,838,401 | A | | 11/1998 | Uehara ......................... 349/58 |
| 6,025,644 | A | | 2/2000 | Imaeda |
| 6,049,469 | A | * | 4/2000 | Hood et al. ................... 361/818 |
| 6,061,231 | A | * | 5/2000 | Crockett ....................... 361/681 |
| 6,150,606 | A | * | 11/2000 | Matsumoto et al. ......... 174/384 |
| 6,181,548 | B1 | * | 1/2001 | Wheeler ...................... 361/681 |

(Continued)

FOREIGN PATENT DOCUMENTS

EP 0 638 832 A2 9/1994

(Continued)

OTHER PUBLICATIONS

International Preliminary Examination Report for PCT/EP2004/001344.

*Primary Examiner*—Jayprakash N Gandhi
*Assistant Examiner*—Anthony Q Edwards
(74) *Attorney, Agent, or Firm*—Myers Bigel Sibley & Sajovec

(57) ABSTRACT

A compact display module for use in electronic devices includes a flat display having a front side with a display surface, and a carrier frame supporting the display. A metal frame is arranged over the front side with an aperture at the display surface. The metal frame has a flat gasket-receiving portion which is parallel to the display surface and extends around the aperture.

5 Claims, 3 Drawing Sheets

U.S. PATENT DOCUMENTS

| | | |
|---|---|---|
| 6,266,120 B1 * | 7/2001 | Han .......................... 349/150 |
| 6,411,353 B1 * | 6/2002 | Yarita et al. ................... 349/59 |
| 6,498,636 B1 * | 12/2002 | Mathew et al. ............. 349/187 |
| 6,657,620 B2 * | 12/2003 | Oishi et al. ................. 345/204 |
| 2001/0019377 A1 | 9/2001 | Fukayama et al. ............ 349/58 |

FOREIGN PATENT DOCUMENTS

| | | |
|---|---|---|
| EP | 0 638 832 | 3/2000 |
| WO | 03/075079 | 9/2003 |

* cited by examiner

COMPACT DISPLAY MODULE

RELATED APPLICATIONS

The present application is a 35 U.S.C. §371 national phase application of PCT International Application No. PCT/EP2004/001344, having an international filing date of Feb. 13, 2004 and claiming priority to European Patent Application Nos. 03075590.4, filed Feb. 27, 2003 and 03011326.0 filed May 19, 2003, and U.S. Provisional Application No. 60/473,508 filed May 27, 2003, the disclosures of which are incorporated herein by reference in their entireties. The above PCT International Application was published in the English language and has International Publication No. WO 2004/077800.

FIELD OF THE INVENTION

The present invention relates to an arrangement for display modules for use in electronic devices, such as portable radio communication terminals. In particular, the invention is advantageous for use in radio communication terminals with detachable and exchangeable covers.

BACKGROUND

The first commercially attractive cellular telephones or terminals were introduced in the market at the end of the 1980's. Since then, a lot of effort has been made in making smaller terminals, with much help from the miniaturisation of electronic components and the development of more efficient batteries. Today, numerous manufacturers offer pocket-sized terminals with a wide variety of capabilities and services, such as packet-oriented transmission and multiple radio band coverage. In order to attract customers the terminal manufacturers have therefore taken further measures to strengthen their position in the competition, one such being to offer terminals with detachable covers or covers. If a user wishes to change the outer appearance of his communication terminal, he can simply buy a new cover of the desired kind. The old cover is preferably released by a simple grip without the aid of tools, where after the new cover can be snapped on. A detachable cover is generally a fairly simple element, essentially formed from a single piece of plastic or possibly metal. The cover may represent only the front side of the terminal, i.e. the side of the terminal carrying the user interface generally comprising a terminal display and keypad, a microphone and a loudspeaker. In such a design, the cover forms a separate part of the cover of the terminal, or optionally an auxiliary part to be attached outside the cover. Alternatively, the cover may include more than one piece, e.g. a front piece and a back piece devised to substantially enclose the terminal. The detachable covers are often provided in different colours, and also with more advanced patterns such as logos or images. The detachable covers of the prior art mainly create an aesthetic effect, changing the visual appearance of the terminal, but may also comprise means for affecting the functions of the terminal.

A housing, detachable or not, devised to cover a terminal front side, or part thereof, is generally arranged with a transparent front window which allows the display to be seen there through and at the same time protects the display. In order to prevent moisture or dust to enter the space between the display and the protective window, a sealing gasket is generally arranged there between. The gasket is often devised to engage a portion of a plastic carrier frame surrounding the display. A problem with such an arrangement is that the surface of the plastic carrier, facing the protective window, is generally neither sufficiently flat nor wide enough to guarantee a secure seal. If the surface of the plastic carrier is widened, the size of the display module will increase, which counteracts the general desire to provide as small terminals as possible.

An alternative state of the art solution is shown in FIG. 1, illustrating a cross-sectional view of a part of a display module 1, with a front side facing upwards. Therein it is clearly illustrated that a display 2 is supported by the plastic carrier 3. In the illustrated prior art embodiment, the display 2 is a Liquid Crystal Display LCD, comprising two glasses with an intermediate layer of liquid crystals. On top of the outermost glass, a polariser 5 is attached. A dust gasket 6 is provided over the edge of polariser 5, devised to engage with a housing of an electronic device into which the display module is to be mounted. A problem with this prior art solution is that when the gasket 6 is applied as illustrated, it may wrinkle causing poor sealing. Moving the gasket further towards the centre of the display module 1 to a flat surface portion of polariser 5, i.e. to the right in the drawing, will decrease the visible part of the display and therefore have a negative effect on the display dimension.

Another problem related to display modules concerns its connection to other parts of an electronic device, such as to a printed circuit board, PCB. FIG. 2 illustrates a cross-sectional view of a part of a prior art display module 1 with an LCD 2 and a polariser 5. A driver 12 is connected to the LCD 2, for applying voltages to the crystals of the LCD 2. A flexible printed circuit board FPC 13 acts as a bus to base band circuits of an electronic device carrying the display module 1. The FPC 13 is sensitive, and optionally also carries some components 14. A plastic carrier for the LCD 2 is preferably included in the display module 1 as well, as in the solution of FIG. 1, but is left out in this drawing for the sake of clarity. Said plastic carrier may also have a cut-out or recessed portioned at the place where the FPC is arranged, such that the FPC does not need to extend around the plastic carrier. Many electronic devices of today, particularly mobile phones, have replaceable covers or housings 11. However, since the FPC 13 is sensitive it may be damaged when the housing 11 is off, or during assembly. Furthermore, the curvature of the FPC allocates some space that could be used for other purposes, or for making the electronic device smaller.

Yet another problem associated with display modules is related to their sensitivity to electrostatic discharge, ESD. However, there is little room outside the LCD to provide an ESD connection to the electronic device, when small dimensions are desired. Furthermore, the ESD connection should preferably be placed close to a battery connector of the electronic device, such as a radio communication terminal.

SUMMARY OF THE INVENTION

An overall object of the invention is to provide a compact display module with increased suitability for use in small size electronic devices. More particularly, an object of the invention is to overcome the aforementioned deficiencies with prior art solutions.

According to a first aspect, this object is fulfilled by a compact display module for use in electronic devices, comprising a flat display having a front side with a display surface, and a carrier frame supporting the display, wherein a metal frame is arranged over said front side with an aperture at said display surface, said metal frame having a flat portion which is parallel to said display surface and extends around said aperture.

Preferably, a gasket is attached to said flat portion, devised to engage and seal against a protective window.

In one embodiment, a perimeter of said aperture defines a viewable portion of said display surface.

Preferably, said display comprises a polariser plate having an outer edge extending under and outside said perimeter of the metal frame aperture.

According to a second aspect, the stated object is fulfilled by a compact display module for use in electronic devices, comprising a flat display having a front side with a display surface, a flexible film connector attached at one end to said display surface and extending about a side edge of the display to a back side, and a carrier frame supporting the display, wherein a metal frame is arranged over said front side with an aperture at said display surface, said metal frame having a front portion which is parallel to said display surface, and a side portion extending substantially perpendicular to said front portion over said side edge, covering said flexible film connector.

Preferably, said side portion of the metal frame presses said flexible film connector towards said side edge.

In one embodiment, said flexible film connector is a flexible printed circuit board FPC.

According to a third aspect, the stated object is fulfilled by a compact display module for use in electronic devices, comprising a flat display having a front side with a display surface, and a carrier frame supporting the display, wherein a metal frame is arranged over said front side with an aperture at said display surface, said metal frame having a front portion which is parallel to said display surface, a side portion extending substantially perpendicular to said front portion over a side edge of the carrier frame, and a ground connector extending from said side portion into a back side of said display module.

Preferably, said ground connector is a tab-like leg member integrated with said metal frame.

In one embodiment, said ground connector is resilient and extends at an angle to said back side.

In a preferred embodiment according to the recited aspects, said metal frame is attached to at least one side edge of said carrier frame.

In a preferred embodiment according to the recited aspects, said metal frame has a material thickness of less than 1 mm.

In a preferred embodiment according to the recited aspects, said metal frame has a material thickness of between 0.05 and 0.3 mm.

According to a fourth aspect, the stated object is fulfilled by a metal carrier for use in a compact display module including any of the features recited above.

According to a fourth aspect, the stated object is fulfilled by an electronic device comprising a compact display module including any of the features recited above.

In a preferred embodiment, said electronic device is a portable radio communication terminal.

BRIEF DESCRIPTION OF THE DRAWINGS

The features and advantages of the present invention will be more apparent from the following description of the preferred embodiments with reference to the accompanying drawings, on which.

DETAILED DESCRIPTION OF PREFERRED EMBODIMENTS

The present description relates to the field of display modules for use in electronic devices, and in particular radio communication terminals. The term radio terminal or communication terminal, also denoted terminal in short in this disclosure, includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants) and DECT terminals (Digital Enhanced Cordless Telephony). Hence, although the structure and characteristics of the invention is mainly described herein, by way of example, in the implementation in a mobile phone, this is not to be interpreted as excluding the embodiment and implementation of the invention in other types of electronic devices. In particular, the invention is suitable for use, though not restricted thereto, in any electronic device where small dimension is of importance, i.e. mainly portable devices. Furthermore, it should be emphasised that the term comprising or comprises, when used in this description and in the appended claims to indicate included features, elements or steps, is in no way to be interpreted as excluding the presence of other features elements or steps than those expressly stated.

Figure 3:
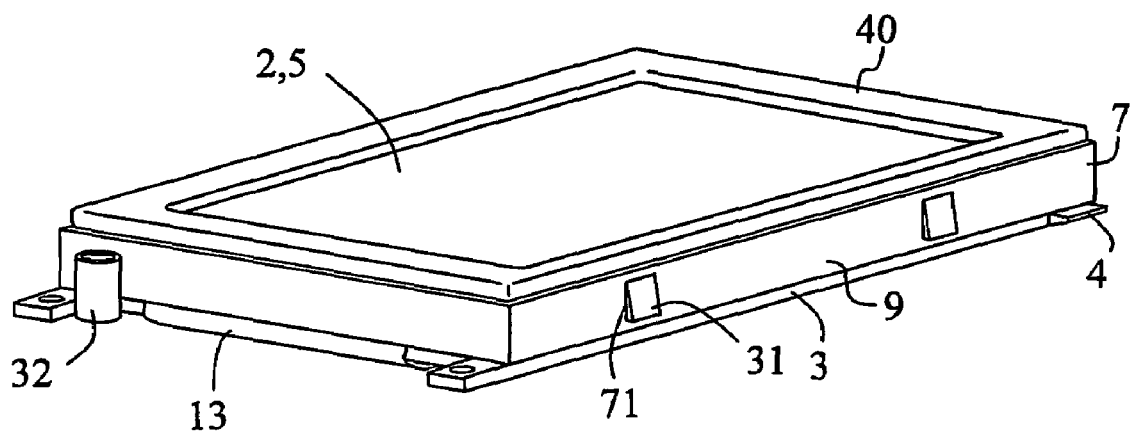
FIG. 3 schematically illustrates an elevated view of a front side of a preferred embodiment of a display module according to the invention, devised with a gasket.

FIG. 3 illustrates a display module 1, with a front side facing upwards. Display module 1 includes a display 2, preferably covered by a polariser 5. A plastic carrier 3 supports the display, and is devised with first attachment means 4, devised for easy attachment to a Printed Circuit Board PCB module (not shown) by latching onto cooperating attachment means on a PCB chassis, without the use of any tools. For this purpose, the plastic carrier is further devised with a guide tower 32, for engagement with a guide pin on said chassis.

Figure 1:
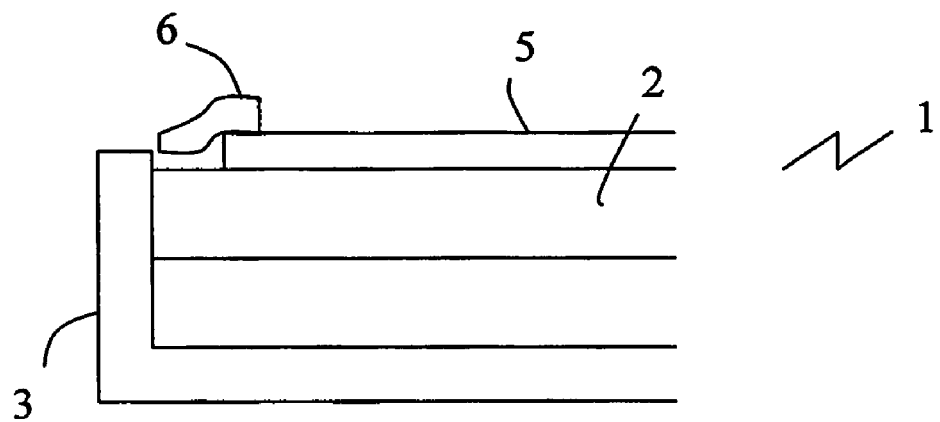
FIG. 1 schematically illustrates a cross-sectional view of a portion of a prior art display module with a gasket.

As will be more clearly shown in subsequent drawings, a metal frame 7 is positioned over the plastic carrier, preferably attached thereto by means of at least one latch 31 on the plastic carrier, engaging with a recess 71 in the metal frame 7. The metal frame 7 is preferably made from a thin single piece of metal, with a material thickness of less than 1 mm, preferably between 0.05 and 0.3 mm, and approximately 0.1 mm. Metal frame 7 has a front portion 8, which in FIG. 1 is substantially covered by a gasket 40, said front portion covering a portion of the front side of the display module 1. Furthermore, metal frame 7 preferably has one, two, three or four side portions 9 extending downwards from the front portion 8. An opening or aperture 10 for allowing visible access to the display 2 is formed in the front portion 8 of metal carrier 7. Preferably, front portion 8 extends a short distance over the polariser 5, such that the opening 10 defines the viewable portion of the display 2. Gasket 40 is attached on the outside of front portion 8 of the metal carrier 7, preferably extending endlessly around aperture 10.

Figure 4:
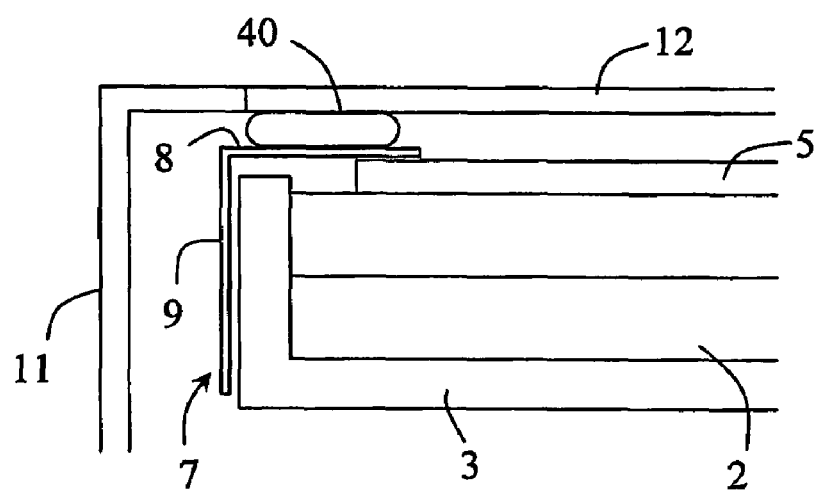
FIG. 4 schematically illustrates a cross-sectional view through a portion of a display module devised according to the invention, fitted with a gasket and a housing.

FIG. 4 illustrates the display module of FIG. 3 as seen in cross-section through side portion 9. This drawing clearly shows how front portion 8 extends from side portion 9 over the front side of the display, a short distance over polariser 5. A housing, or housing portion, 11 of an electronic device in which display module included is disposed outside metal frame 7. The housing also includes a protective front window 12 over the display 2. The front window 12 and metal frame 7 oppose each other with wide and substantially flat surfaces, between which gasket 40 is positioned. This way, the metal frame provides an even and relatively large area for gasket 40, much wider than the upper edge of plastic carrier 3. This allows for larger tolerances for assembly of the gasket 6, and a more dust-proof design. In the illustrated embodiment, window 12 extends over gasket 40, but a smaller window 12 may of course be selected with gasket 40 hidden under an opaque part of housing 11.

Figure 2:
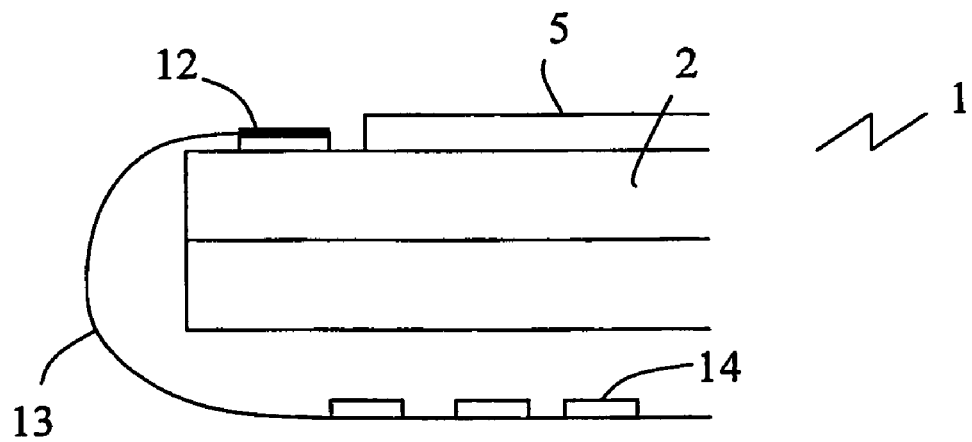
FIG. 2 schematically illustrates a cross-sectional view of a portion of a prior art display module with an FPC connector.
Figure 5:
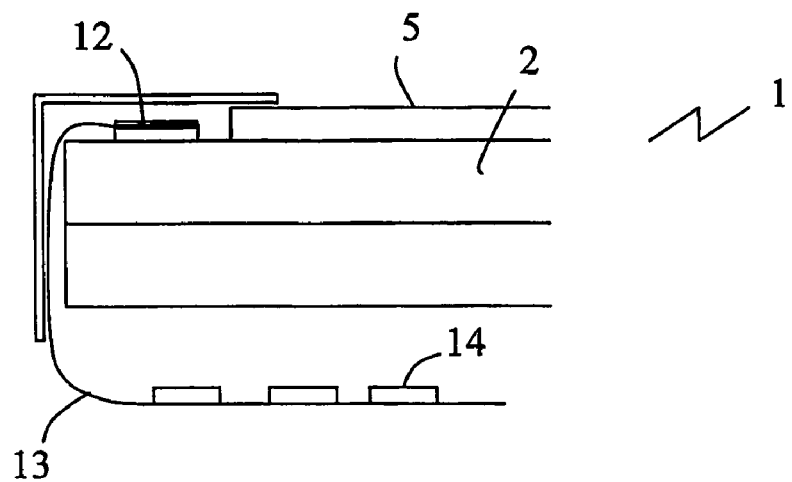
FIG. 5 schematically illustrates a cross-sectional view through a portion of a display module devised according to the invention, through an FPC display connector.

FIG. 5 shows a cross-sectional view of one embodiment of a display module 1 according to the invention, with metal frame 7 applied over the display 2. As for FIG. 2, plastic frame 3 has been left out. The cross-section is taken through a side of the display module at which an FPC 13 extends from display 2. In FIG. 3, this side faces to the left, and FPC 13 can be seen as it extends under the metal frame 7 also in that drawing. Returning to FIG. 5, this drawing shows how a large portion of the sensitive FPC 13 extending over the side edge of the display is protected by metal frame 7. If an exchangeable cover had been designed to engage with and press the FPC 13 inwards, for the purpose of obtaining a small and compact electronic device, assembly and disassembly would involve a risk for damaging the FPC 13. However, since metal carrier 7 is permanently attached, meaning that it is not removed when a housing 11 is changed, it may be placed closer to display 2, pressing FPC 13 towards display 2. Consequently, with the permanently attached metal frame 7, the total length of the display module 1 is decreased. Accordingly, space is also saved in the electronic device into which the display module is to be introduced, which either makes the device smaller, or can be used for other purposes such as including other components.

Figure 6:
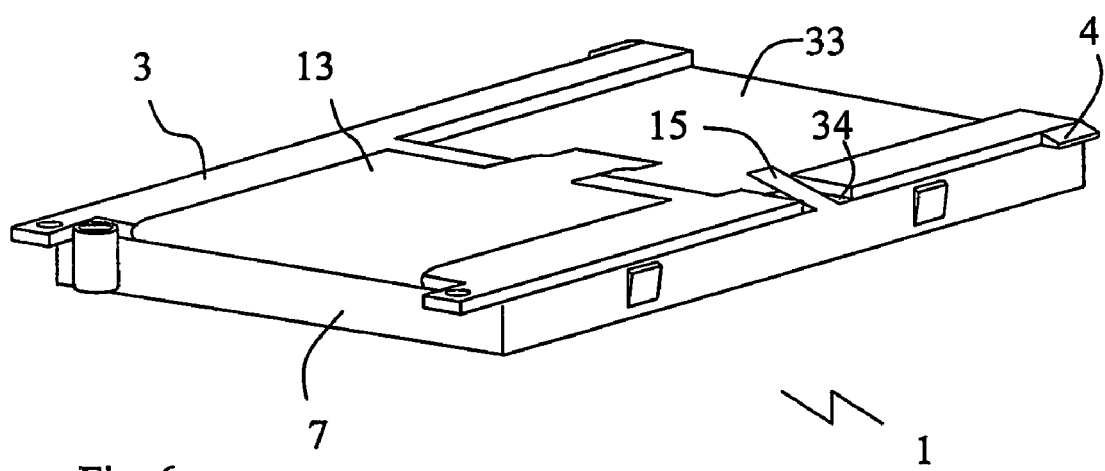
FIG. 6 schematically illustrates an elevated view of a back side of a preferred embodiment of a display module according to the invention.

FIG. 6 illustrates a display module 1 according to an embodiment of the invention, from its back side. The metal frame 7 preferably only extends over the front portion 8 and one or more side portions, as previously described. However, in one embodiment a ground connector 15 extends from a side portion 9, into the back side of the display module 1. The display module 1 is attachable to a PCB module or chassis at this back side, and particularly a ground plane of the PCB module. A lowered portion 33 may be devised on the back side of the plastic carrier 3 of display module 1, for receiving the PCB module. When assembled, ground connector 15 connects to a ground pad on the PCB module. The ground connector 15 extends inwards the backside, preferably at an angle from a back side plane, as illustrated. In such an embodiment, the ground connector will be devised as a resilient spring, by means of which contact with said ground pad will be more effectively maintained when the ground pad is pressed against the ground connector towards the display module backside. In a preferred embodiment, the ground connector is devised as a tab-like leg member 15, which is integral with side portion 9 and bent over the back side corner edge of plastic carrier 3. A recess 34 may also be arranged in plastic carrier 3 for the purpose of receiving ground connector 15.

In a preferred embodiment, attachment means 4 are devised to engaged with a cooperating attachment holder in a PCB module or chassis. The attachment means includes a sideways protruding member 4 from the plastic carrier 3 of the display module 1. The protruding member is elastically mounted to the plastic carrier, preferably integral therewith, and the protruding member 4 is biased outwards. A chamfered edge of said cooperating attachment holder guides the attachment means 4, and thereby also automatically urges the attachment means inwards so that they may extend into holder means. Once in place, the protruding member will snap out and engage behind a shoulder portion of holder means 17. An advantage with the invention is that excellent rough guiding is achieved upon assembly while using little space. Furthermore, faster assembly may be achieved. Preferably, the PCB module and the display module 1 are pressed together by manual force.

In a preferred embodiment, the display module 1 according to the invention is included in a portable radio communication terminal, such as a mobile phone.

The foregoing has described the principles, preferred embodiments and modes of operation of the present invention. However, the invention should not be construed as being limited to the particular embodiments discussed above, which should be regarded as illustrative rather than restrictive. It should therefore be appreciated that variations may be made in those embodiments by workers skilled in the art without departing from the scope of the present invention, as defined by the following claims.

The invention claimed is:

1. A compact display module for use in electronic devices, comprising a flat display having a front side with a display surface, a carrier frame supporting the display, a metal frame arranged over the front side with an aperture at the display surface, the metal frame having a front portion which is parallel to the display surface and extends around the aperture, and a side portion extending substantially perpendicular to the front portion over a side edge of the carrier frame, and wherein a back side of said carrier frame is configured to receive a PCB, wherein a tab-like leg member, integrated with the metal frame, extends from the side portion into the back side of the carrier frame and is configured to resiliently connect to the PCB and the backside of the carrier frame is connectable to the PCB by means of a first latch, and the metal frame is attached to at least one side edge of the carrier frame by a second latch.

2. The compact display module as recited in claim 1, wherein the tab-like leg member is resilient and extends at an angle to the back side.

3. The compact display module as recited in claim 2, wherein a recess is formed in the back side of the carrier frame for receiving the tab-like leg member.

4. The compact display module as recited in claim 1, wherein the metal frame has a material thickness of less than 1 mm.

5. The compact display module as recited claim 1, wherein the metal frame has a material thickness of between 0.005 and 0.3 mm.

* * * * *